US012373536B2

(12) United States Patent
Park

(10) Patent No.: US 12,373,536 B2
(45) Date of Patent: Jul. 29, 2025

(54) DEVICE FOR TRANSMITTING AUTHENTICATION INFORMATION

(71) Applicant: MUZLIVE INC., Seoul (KR)

(72) Inventor: Jong Sung Park, Seoul (KR)

(73) Assignee: MUZLIVE INC., Seoul (KR)

( * ) Notice: Subject to any disclaimer, the term of this patent is extended or adjusted under 35 U.S.C. 154(b) by 340 days.

(21) Appl. No.: 18/023,544

(22) PCT Filed: Nov. 23, 2020

(86) PCT No.: PCT/KR2020/016566
§ 371 (c)(1),
(2) Date: Feb. 27, 2023

(87) PCT Pub. No.: WO2022/050498
PCT Pub. Date: Mar. 10, 2022

(65) Prior Publication Data
US 2023/0325485 A1 Oct. 12, 2023

(30) Foreign Application Priority Data

Sep. 3, 2020 (KR) .......... 10-2020-0112424

(51) Int. Cl.
*G06F 21/34* (2013.01)
*H04B 11/00* (2006.01)

(52) U.S. Cl.
CPC .......... *G06F 21/34* (2013.01); *H04B 11/00* (2013.01)

(58) Field of Classification Search
CPC .......... G06F 21/34; G06F 21/35; G06F 21/45; G06F 21/60; G06F 21/606; H04B 11/00; H04R 17/00
See application file for complete search history.

(56) References Cited

U.S. PATENT DOCUMENTS

2023/0325485 A1* 10/2023 Park .......... G06F 21/35

FOREIGN PATENT DOCUMENTS

| EP | 2118805 B1 * | 11/2012 | .......... G06F 21/35 |
| ES | 2399461 T3 * | 4/2013 | .......... G06F 21/35 |
| JP | 2019046270 A * | 3/2019 | .......... G08B 17/10 |
| JP | 7486664 B2 * | 5/2024 | .......... G06F 21/34 |
| KR | 20-0134529 Y1 | 1/1999 | |

(Continued)

OTHER PUBLICATIONS

International Search Report from corresponding PCT Application No. PCT/KR2020/016566, dated Sep. 24, 2021.

*Primary Examiner* — Daniel Pihulic
(74) *Attorney, Agent, or Firm* — Harness, Dickey & Pierce, P.L.C.

(57) ABSTRACT

A device for transmitting authentication information is disclosed. The device for transmitting authentication information according to an embodiment of the present invention comprises: a housing in which a predetermined space is formed; an acoustic output part which is partially exposed outside the housing, is pushed a predetermined distance backward when pressed by an external force, moves forward and returns to the original position in the state where the external force is released, and when pushed backward, outputs authentication information converted into an acoustic signal; and a substrate having a plurality of acoustic output part-coupling holes to which the acoustic output part is coupled movably back and forth.

11 Claims, 5 Drawing Sheets

(56) References Cited

FOREIGN PATENT DOCUMENTS

| KR | 2004-0013888 A | 2/2004 | | |
|----|----------------|--------|---|---|
| KR | 2006-0056334 A | 5/2006 | | |
| KR | 2014-0147035 A | 12/2014 | | |
| KR | 2020-0047214 A | 5/2020 | | |
| KR | 2020116361 A | * | 10/2020 | |
| WO | WO-2022050498 A1 | * | 3/2022 | ............. G06F 21/34 |

\* cited by examiner

DEVICE FOR TRANSMITTING AUTHENTICATION INFORMATION

CROSS-REFERENCE TO RELATED APPLICATIONS

This application is a national phase application of PCT Application No. PCT/KR2020/016566, filed on Nov. 23, 2020, which claims benefit of Korean Patent Application No. 10-2020-0112424, filed on Sep. 3, 2020. The entire disclosure of the applications identified in this paragraph are incorporated herein by references.

TECHNICAL FIELD

The present invention relates to an authentication information transmission device, and more particularly, to a device that outputs ultrasonic waves to the outside through external pressure.

BACKGROUND ART

A cultural technology narrowly refers to a technology required for planning, development, production, and the like of various types of cultural content such as movies, games, and animations, but in a broad sense, refers to an overall technology for improving the quality of cultural life on the basis of science and technology.

With the development of such a cultural technology, a new type of content transfer medium that breaks away from an existing scheme has begun to appear. For example, in an album market, USB-type albums or albums that can be connected to an AUX terminal of a smartphone have begun to appear to replace traditional CD-type albums.

Such new types of albums are distributed in the form of sales of a storage medium having authentication information stored therein. When a user who purchases the storage medium having authentication information stored therein connects the storage medium to a terminal device such as a smartphone or tablet PC and then executes a corresponding application, music content corresponding to the authentication information is downloaded from a server to the terminal device.

However, since recent smart phones, tablet PCs, or the like are released without a traditional interface such as an AUX terminal, a problem has arisen in that the interface as described above cannot be utilized to transmit the authentication information stored in the storage medium to a user terminal device.

A method of transmitting the authentication information to the user terminal device through a wireless communication network interface such as Wi-Fi or Bluetooth may be considered, but in this case, there are problems that the storage medium having the authentication information stored therein should include a wireless communication network module as described above, and it takes a predetermined time to construct a pairing between the user terminal device and the storage medium, making users uncomfortable.

Accordingly, a device capable of transmitting authentication information to a user terminal device without having a communication module is being developed.

However, since such a device should include a storage unit that stores authentication information, a power supply unit that supplies power, an MCU that controls an overall operation of the device, and the like in a narrow internal space, there is a problem that a connection structure between the elements is complicated, and internal elements may be damaged or disconnection may occur due to negligence in use.

Accordingly, a need for a new type of authentication information transmission device capable of improving durability of the device has emerged.

SUMMARY

The present invention has been made to solve the above problems, and an object of the present invention is to provide a device capable of easily transmitting authentication information by transferring ultrasonic waves corresponding to the authentication information to an external device.

Another object of the present invention is to provide a device capable of preventing a problem such as a disconnection from occurring when an element included inside the device is detached from a board due to negligence in use.

Accordingly, a need has emerged for a new type of authentication information transmission device using inaudible sound wave communication capable of improving security while enjoying advantages of the inaudible sound wave communication, and a method therefor.

An authentication information transmission device according to an embodiment of the present invention for achieving the above-described object includes a housing having a predetermined space formed therein; a sound wave output unit configured to be partially exposed to the outside of the housing, be pushed backward by a predetermined distance when the sound wave output unit is pressed by an external force, move forward to return to an original position in a state in which the external force is removed, and output authentication information converted into a sound wave signal when the sound wave output unit is pushed backward; and a board including a plurality of sound wave output unit coupling holes to which the sound wave output unit can be coupled to be movable forward or backward.

According to an embodiment of the present invention, the sound wave output unit may include a protrusion portion having an opening formed at one end so that a sound wave signal can be emitted to the outside; a body having a predetermined space formed therein, a speaker being accommodated in the predetermined space; protrusions extending downward from the body and coupled to sound wave output portion coupling holes formed in the board; and a wire insertion groove, the wire insertion groove being a path through which a wire extending from the speaker is exposed to the outside of the body.

According to an embodiment of the present invention, the speaker may output authentication information converted into a sound wave signal and may be coupled to the inside of the body while forming a predetermined angle with the board.

According to an embodiment of the present invention, the speaker may have a predetermined space formed in a portion in which the speaker faces the opening and may be coupled at a predetermined angle to come into contact with the body on the side opposite to the opening.

According to an embodiment of the present invention, areas of the sound wave output unit coupling holes formed in the board may be larger than areas of horizontal cross sections of the protrusions.

According to an embodiment of the present invention, when the protrusions are inserted into the sound wave output unit coupling holes, predetermined empty spaces may be formed in the sound wave output unit coupling holes.

According to an embodiment of the present invention, the board further includes a switching unit included adjacent to a position at which the sound wave output unit is coupled, the switching unit including a button protruding in a direction of the position at which the sound wave output unit is coupled.

According to an embodiment of the present invention, when the sound wave output unit is pressed by an external force, the sound wave output unit may be pushed backward by a difference between the areas of the sound wave output unit coupling holes and the areas of the horizontal cross sections of the projections, and the button of the switching unit may be pressed when the sound wave output unit is pushed backward.

According to an embodiment of the present invention, the board may include wire connection unit coupling holes formed at positions spaced apart from the sound wave output unit coupling holes by a predetermined distance, and wire connection units may be coupled to the wire connection unit coupling holes.

According to an embodiment of the present invention, a wire fastening unit connected to a distal end of a wire extending from a speaker accommodated inside the sound wave output unit may be inserted into and fastened to the wire connection unit to electrically connect the wire to the wire connection unit, and a length of the wire may be longer than a straight line distance from a center of the sound wave output unit to the wire connection unit.

According to an embodiment of the present invention, the wire fastening unit may be detachably inserted into and fastened to the wire connection unit, and be detached from the wire connection unit when an external force is applied.

Advantageous Effects

According to the authentication information transmission device according to an embodiment of the present invention described above, it is possible to achieve an effect of improved durability of a device.

Further, even when the authentication information transmission device falls from a predetermined height due to negligence in use, it is possible to achieve an effect of solving a problem of a disconnection.

Effects of the present invention are not limited to the effects mentioned above, and other effects not mentioned will be clearly understood by those skilled in the art from the description of the claims.

DESCRIPTION OF EXEMPLARY EMBODIMENTS

Hereinafter, embodiments of the present invention will be described in detail with reference to the accompanying drawings. However, the accompanying drawings are only described in order to more easily disclose the content of the present invention, and it can be easily understood by those skilled in the art that the scope of the present invention is not limited to the scope of the accompanying drawings.

When the embodiments of the present invention are described, the same names and the same reference signs are used for components having the same functions, but it is to be noted in advance that the components are not substantially the same as those of the prior art.

Further, terms used herein are only used to describe specific embodiments, and are not intended to limit the present invention. Singular expressions include plural expressions unless the context clearly dictates otherwise. It should be understood that the terms "include" or "have" used therein are intended to designate that there is a feature, number, step, operation, component, part, or combination thereof described herein, and does not preclude the presence or addition of one or more other features numbers, steps, operations, components, parts, or combinations thereof.

Figure 1:
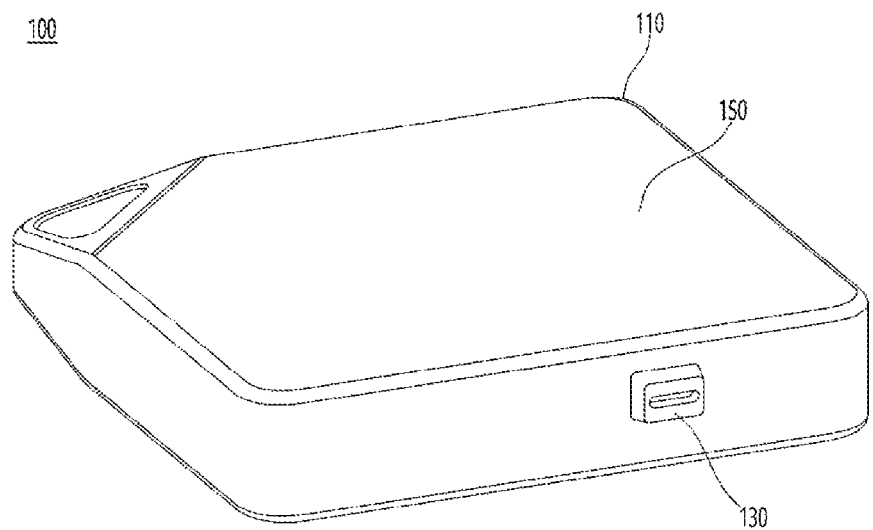
FIG. 1 is a perspective view illustrating an authentication information transmission device according to an embodiment of the present invention.

FIG. 1 is a perspective view illustrating an authentication information transmission device according to an embodiment of the present invention.

An authentication information transmission device 100 according to an embodiment of the present invention includes a housing 110, a sound wave output unit 130, and a board 150.

The housing 110 forms an exterior of the authentication information transmission device 100 and protects internal components. To this end, a predetermined space may be formed inside the housing 110.

The housing 110 according to an embodiment of the present invention may be formed by injecting a synthetic resin or may be formed to have a metal material. Further, an opening through which a part of the sound wave output unit 130 is exposed to the outside may be formed on one side of the housing 110.

The sound wave output unit 130 is partially exposed to the outside of the housing 110, is pushed backward by a predetermined distance when the sound wave output unit 130 is pressed by an external force, moves forward to return to an original position in a state in which the external force is removed, and outputs authentication information converted into a sound wave signal through the opening formed at one end when the sound wave output unit 130 is pushed backward.

Since a speaker (not illustrated) capable of generating ultrasonic waves is included inside the sound wave output unit 130, the ultrasonic waves are output from the speaker when the sound wave output unit 130 is pressed by an external force.

Specifically, when the sound wave output unit 130 is pushed backward by being pressed by the external force, a button of a switching unit (not illustrated) adjacent to the sound wave output unit 130 is pressed, and accordingly, authentication information is converted into a sound wave signal and the converted sound wave signal is output to the outside through the sound wave output unit 130.

The board 150 is located inside the housing 110 and elements for driving the authentication information transmission device 100 are disposed therein. The board 150 according to an embodiment of the present invention includes a storage element (not illustrated) that stores the authentication information, an MCU (not illustrated) that detects pressing of the sound wave output unit 130 and changes the authentication information stored in the storage element into a sound wave signal, and a power supply unit (not illustrated) that supplies a supply voltage to elements included in the board 150.

In this case, a plurality of sound wave output unit coupling holes to which the sound wave output unit 130 can be coupled to be moveable forward or backward may be formed in the board 150. A detailed structure of the board 150 and elements that can be coupled to the board 150 will be described in detail below.

Figure 2:
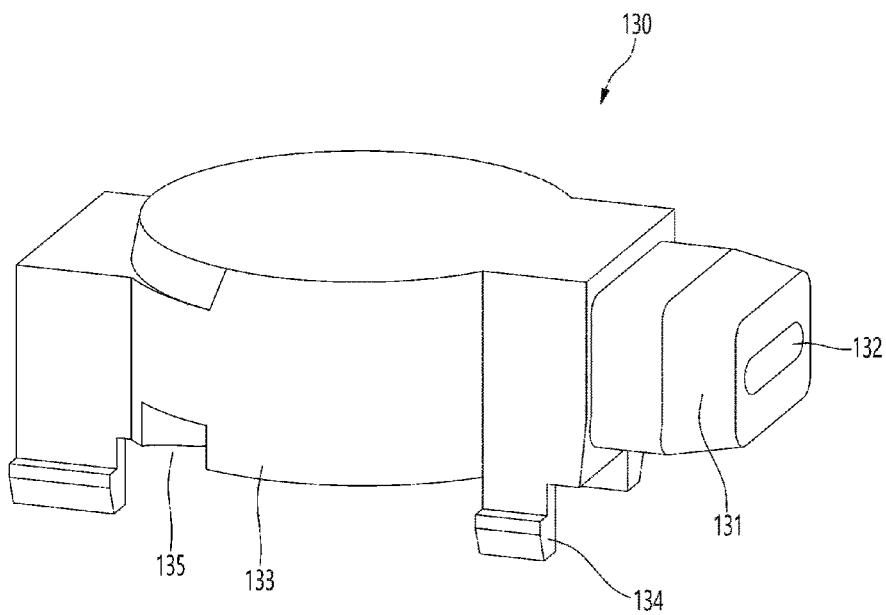
FIG. 2 is a diagram illustrating a sound wave output unit according to an embodiment of the present invention.

FIG. 2 is a diagram illustrating the sound wave output unit according to an embodiment of the present invention.

The sound wave output unit 130 according to an embodiment of the present invention includes a protrusion portion 131, an opening 132, a body 133, projections 134, and a wire insertion groove 135.

The protrusion portion 131 extends by a predetermined length from the body 133 so that the protrusion portion 131 is exposed to the outside of the housing 110. A user may press the protrusion portion 131 protruding to the outside of the housing 110 so that the authentication information is output.

The opening 132 is formed on one side of the protrusion portion 131 so that the sound wave signal output from the speaker accommodated inside the body 133 can be emitted to the outside.

The body 133 forms a basic skeleton of the sound wave output unit 130 and provides an internal space in which the speaker can be accommodated. In an embodiment, the body 133 may be formed to a size allowing the body 133 to surround the speaker. Further, the body 133 may have a circular cross section as illustrated in FIG. 2, but the shape of the body 133 is not limited thereto and may be implemented in various shapes corresponding to a shape of the speaker that is an accommodation target.

The projections 134 extend downward from the body 133. The projections 134 according to an embodiment of the present invention are coupled to coupling holes formed in the board 150 to fix the sound wave output unit 130 to the board 150. To this end, a locking projection may be formed at a distal end of the projection 134.

The wire insertion groove 135 provides a path through which a wire of the speaker is exposed. Since at least one wire is connected to the speaker accommodated inside the body 133, the wire may be exposed to the outside of the body 133 through the wire insertion groove 135 and may be directly connected to the board 150 or be connected to other elements.

Figure 3:
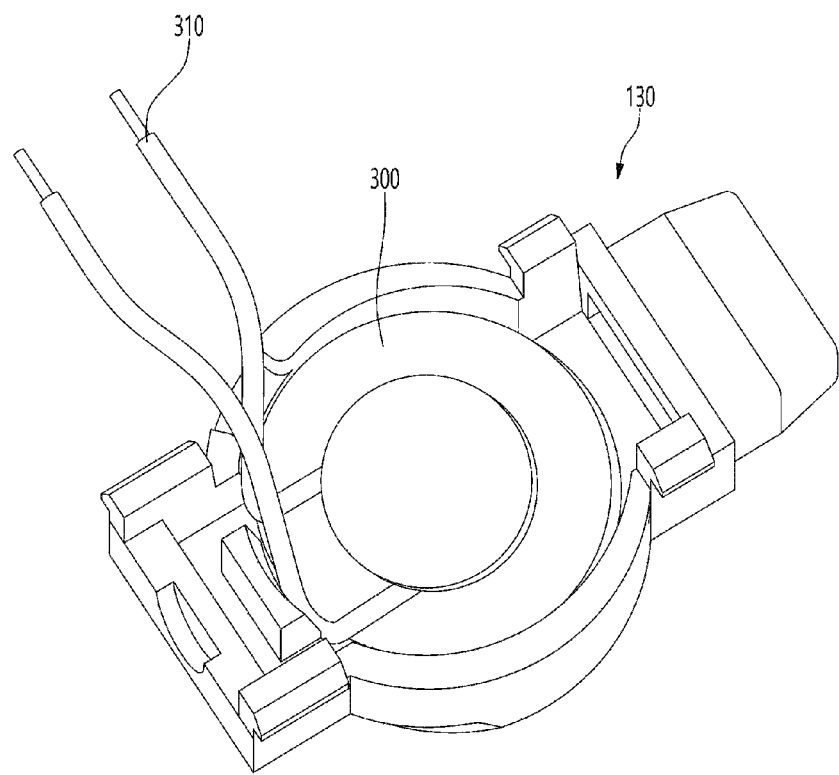
FIG. 3 is a view illustrating a state in which a speaker is accommodated in the sound wave output unit according to an embodiment of the present invention.

FIG. 3 is a view illustrating a state in which the speaker is accommodated in the sound wave output unit according to an embodiment of the present invention.

A speaker 300 according to an embodiment of the present invention is accommodated inside the body 133 of the sound wave output unit 130 and outputs authentication information converted into a sound wave signal. Further, since at least one wire 310 is included in the speaker 300, the wire 310 extending from the speaker 300 is exposed to the outside through the wire insertion groove 135 and is directly connected to the board 150 or is connected to other elements.

Figure 4:
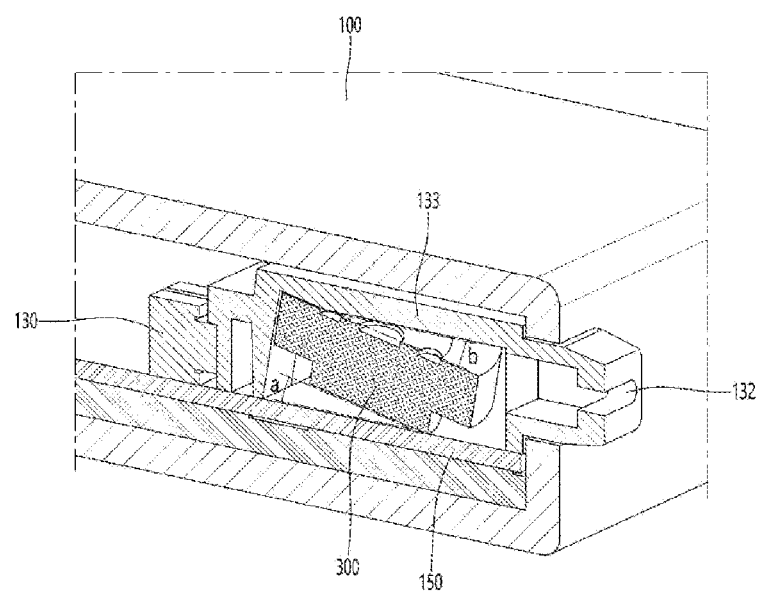
FIG. 4 is a cross-sectional view in a state in which the speaker is accommodated in the sound wave output unit according to an embodiment of the present invention.

FIG. 4 is a cross-sectional view in a state in which the speaker is accommodated in the sound wave output unit according to an embodiment of the present invention.

When the speaker 300 according to an embodiment of the present invention is accommodated in the body 133 of the sound wave output unit 130, the speaker 300 is coupled to the board 150 at a predetermined angle.

This is because the sound wave signal generated by the speaker 300 is output to the outside through the opening 132, and when the speaker 300 is coupled in parallel with the board 150, the sound wave signal output from the speaker 300 is reflected inside the body 133 due to diffraction of ultrasonic waves and cannot be output to the outside.

To this end, the speaker 300 according to an embodiment of the present invention may have a predetermined space formed in a portion in which the speaker 300 may face the opening 132, and may be coupled at a predetermined angle to come into contact with an inner surface of the body 133 on the side opposite to the opening 132 so that the sound wave signal is directed to the opening 132.

The predetermined angle according to an embodiment of the present invention may be determined in a range of larger than 0 degrees and smaller than 90 degrees. This is because, when the predetermined angle is 0 degrees, a phenomenon of diffraction of ultrasonic waves cannot be prevented, and when the predetermined angle is 90 degrees, the speaker 300 should be coupled vertically, which makes it impossible to efficiently dispose the speaker 300 in a narrow space.

Figure 5:
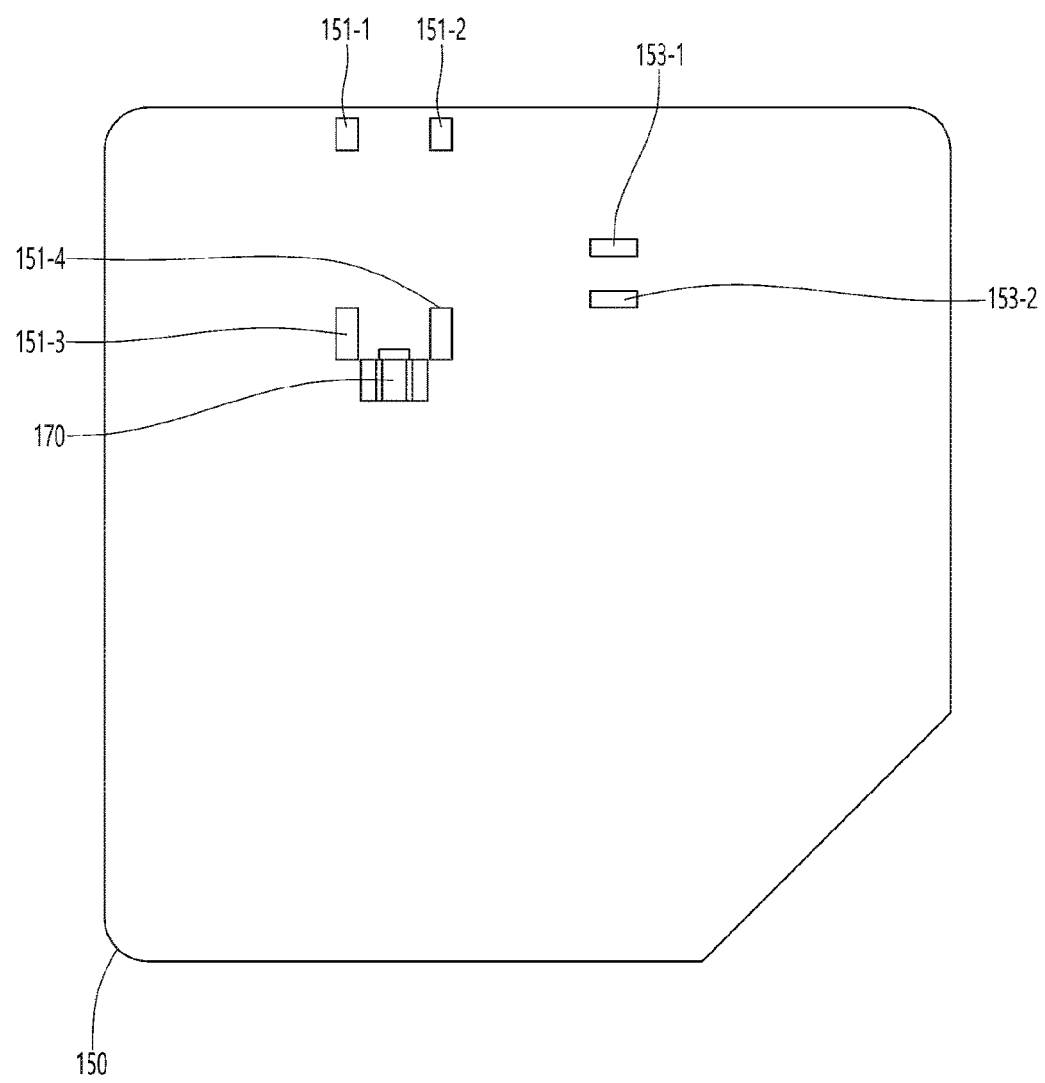
FIG. 5 is a view illustrating a board according to an embodiment of the present invention.

FIG. 5 is a view illustrating the board according to an embodiment of the present invention.

A plurality of sound wave output unit coupling holes 151-1, 151-2, 151-3, and 151-4 to which the sound wave output unit 130 is coupled, and a plurality of wire connection unit coupling holes 153-1 and 153-2 are formed in the board 150 according to an embodiment of the present invention.

The sound wave output unit 130 is coupled to the plurality of sound wave output unit coupling holes 151-1, 151-2, 151-3, and 151-4. Specifically, a plurality of projections formed on the sound wave output unit 130 are inserted into and coupled to the plurality of sound wave output unit coupling holes 151-1, 151-2, 151-3, and 151-4. In this case, areas of the sound wave output unit coupling holes 151-1, 151-2, 151-3, and 151-4 may be larger than areas of horizontal cross sections of the protrusions.

Therefore, when the projections of the sound wave output unit 130 are inserted into the sound wave output unit coupling holes 151-1, 151-2, 151-3, and 151-4, predetermined empty spaces may be formed and the sound wave output unit 130 may be moved forward or backward in a state in which the sound wave output unit 130 is coupled to the sound wave output unit coupling holes 151-1, 151-2, 151-3, and 151-4.

The plurality of wire connection unit coupling holes 153-1 and 153-2 are formed at positions adjacent to the sound wave output unit coupling holes 151-1, 151-2, 151-3, and 151-4. The wire connection unit coupling holes 153-1 and 153-2 are spaces for insertion and fastening of wire connection units that can be connected to a wire connected to the speaker accommodated inside the sound wave output unit 130.

Sizes of the wire connection unit coupling holes 153-1 and 153-2 may be formed to have the same length and width as the projections formed in the wire connection units so that the wire connection units do not move when the projections formed in the wire connection units are inserted into the wire connection unit coupling holes 153-1 and 153-2.

Meanwhile, a switching unit 170 is included adjacent to a position at which the sound wave output unit 130 is coupled on the board 150 according to an embodiment of the present invention. A button (not illustrated) protrudes in a direction in which the sound wave output unit 130 is coupled, in the switching unit 170.

The button is interlocked with the MCU mounted on the speaker board 150 accommodated inside the sound wave output unit 130, and when the button is pressed, authentication information converted into a sound wave signal is output from the speaker according to a control signal of the MCU.

Specifically, when the sound wave output unit 130 is moved backward due to an external force, the button is pressed, and as a result, the authentication information in the form of a sound wave signal is output from the speaker.

Figure 6:
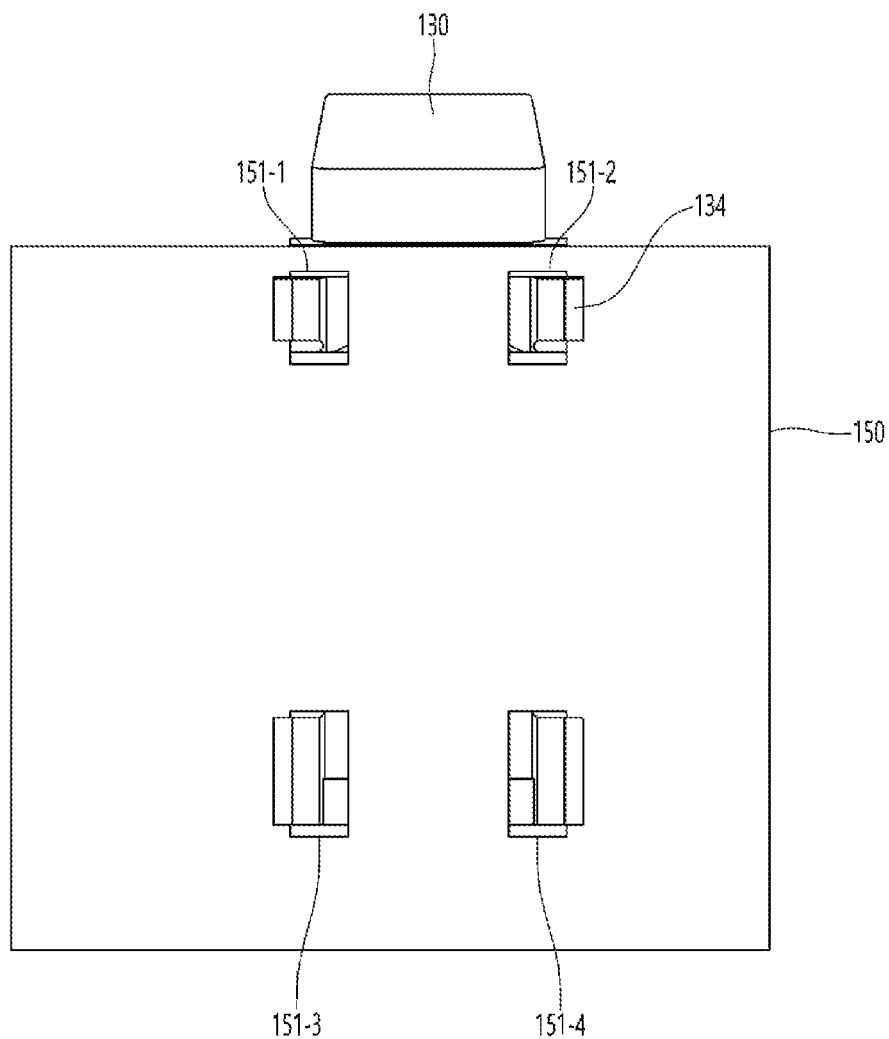
FIG. 6 is a view illustrating a lower portion of the board in a state in which the sound wave output unit is coupled to the board according to an embodiment of the present invention.

FIG. 6 is a view illustrating a lower portion of the board in a state in which the sound wave output unit is coupled to the board according to an embodiment of the present invention.

The projections 134 of the sound wave output unit 130 are inserted into and fastened to the sound wave output unit coupling holes 151-1, 151-2, 151-3, and 151-4 according to an embodiment of the present invention.

In this case, areas of the sound wave output unit coupling holes 151-1, 151-2, 151-3, and 151-4 may be larger than areas of cross sections of the projections 134. Accordingly, a space allowing the sound wave output unit 130 to move backward when the sound wave output unit 130 is pressed may be secured.

Specifically, when the user presses the sound wave output unit 130 protruding to the outside of the housing 110, the sound wave output unit 130 is pushed backward by a difference between the areas of the sound wave output unit coupling holes 151-1, 151-2, 151-3, and 151-4 and the areas of vertical cross sections of the projections 134.

The switching unit and a button included in the switching unit, which will be described below, are disposed adjacent to the sound wave output unit 130 behind the sound wave output unit 130, and when the sound wave output unit 130 is pushed backward, the button of the switching unit is naturally pressed.

Figure 7:
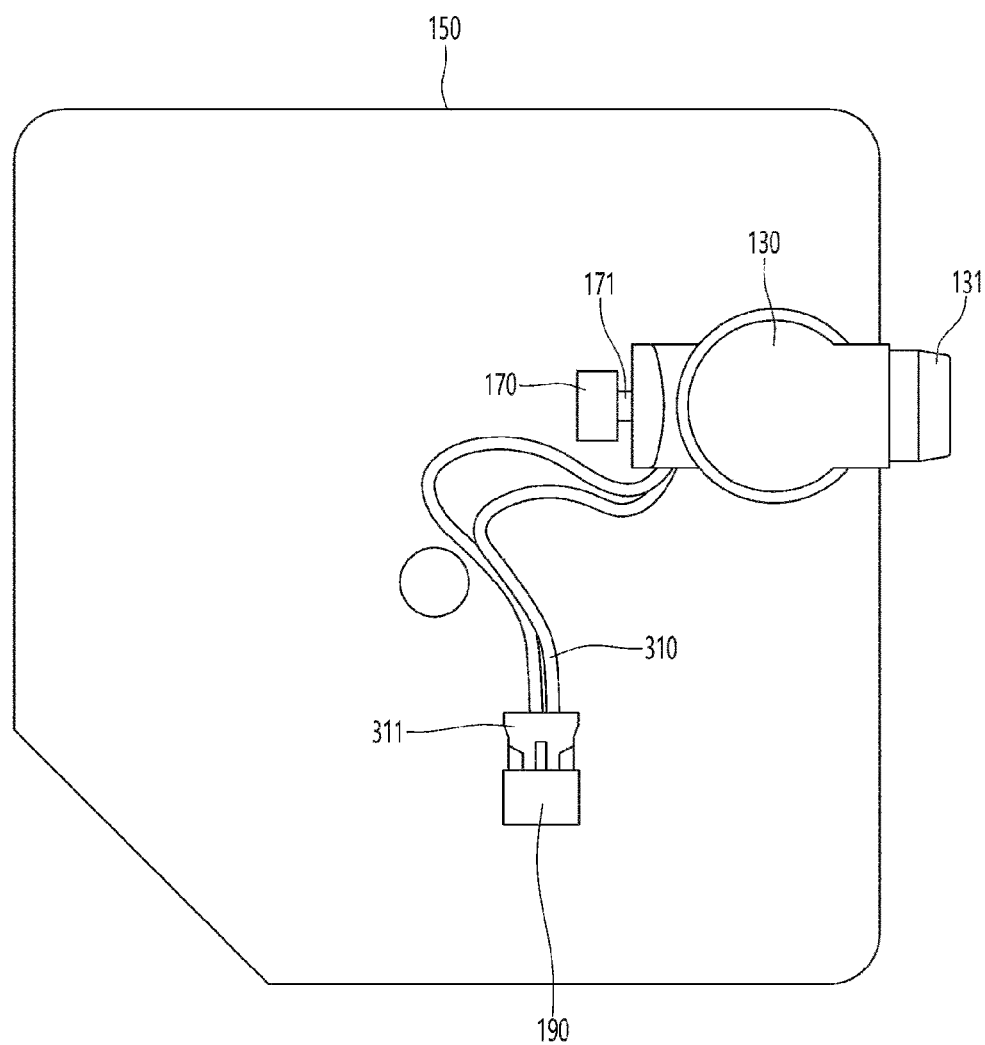
FIG. 7 is a diagram illustrating the sound wave output unit coupled to the board according to an embodiment of the present invention.

FIG. 7 is a diagram illustrating the sound wave output unit coupled to the board according to an embodiment of the present invention.

As described with reference to FIG. 5, on the board 150, the switching unit 170 is included adjacent to a position at which the sound wave output unit 130 is coupled. Further, in the switching unit 170, the button 171 protrudes in a direction in which the sound wave output unit 130 is coupled.

When the sound wave output unit 130 is coupled to the board 150 through the sound wave output unit coupling holes 151-1, 151-2, 151-3, and 151-4, a surface opposite to the protrusion portion 131 comes into contacts with the button 171 of the switching unit 170.

In this state, when the user presses the protrusion portion 131 protruding to the outside of the housing 110, the button 171 is pressed while the sound wave output unit 130 being pushed backward by the difference between the areas of the sound wave output unit coupling holes 151-1, 151-2, 151-3, and 151-4 and the areas of the vertical cross sections of the projections 134.

When the button 171 is pressed, the MCU operates and pre-stored authentication information is converted into a sound wave form, and the sound wave signal is output to the outside through the speaker 300.

Meanwhile, wire connection units 190 may be coupled to the board 150. The wire connection units 190 according to an embodiment of the present invention are coupled to the board 150 by being fastened to the wire connection unit coupling holes 153-1 and 153-2 formed at positions spaced apart from the sound wave output unit coupling holes 151-1, 151-2, 151-3, and 151-4 by a predetermined distance.

A wire fastening unit 311 is connected to a distal end of the wire 310 extending from the speaker 300. The wire fastening unit 311 is inserted into and fastened to the wire connection unit 190 to electrically connect the wire 310 to the wire connection unit 190. In this case, a length of the wire 310 is longer than a straight line distance from a center of the sound wave output unit 130 to the wire connection unit 190.

Further, when an external force is applied to the authentication information transmission device 100, the wire fastening unit 311 connected to the wire connection unit 190 is detached from the wire connection unit 190.

In general, in order to electrically connect the wire 310 to the board 150, a fixing coupling means such as soldering is adopted, but in this case, when a solder is separated by an external force, an electrical connection is disconnected and a smooth operation is not performed.

Accordingly, the wire fastening unit 311 according to an embodiment of the present invention is detachably inserted into and fastened to the wire connection unit 190, and the length of the wire 310 is longer than the straight line distance from the center of the sound wave output unit 130 to the wire connection unit 190.

Therefore, it is possible to prevent a phenomenon in which an electrical connection of the wire 310 is disconnected even when the sound wave output unit 130 is detached from the board 150 due to negligence in use, and to easily solve a failure problem by inserting and fastening the wire 310 into and to the wire connection unit 190 again even when the wire 310 is detached from the wire connection unit 190.

The preferred embodiments according to the present invention have been described above, and it is obvious to those skilled in the art that the present invention can be embodied in other specific forms without departing from the spirit or scope of the present invention, in addition to the above-described embodiments. Therefore, the above-described embodiments are to be regarded as illustrative rather than restrictive, and thus the present invention is not limited to the above description, but may be changed within the appended claims and their equivalents.

What is claimed is:

1. An authentication information transmission device comprising:
   a housing having a predetermined space formed therein;
   a sound wave output unit configured to be partially exposed to the outside of the housing, be pushed backward by a predetermined distance when the sound wave output unit is pressed by an external force, move forward to return to an original position in a state in which the external force is removed, and output authentication information converted into a sound wave signal when the sound wave output unit is pushed backward; and
   a board including a plurality of sound wave output unit coupling holes to which the sound wave output unit can be coupled to be movable forward or backward.

2. The authentication information transmission device according to claim 1, wherein the sound wave output unit includes a protrusion portion having an opening formed at one end so that a sound wave signal can be emitted to the outside;

a body having a predetermined space formed therein, a speaker being accommodated in the predetermined space;

protrusions extending downward from the body and coupled to sound wave output portion coupling holes formed in the board; and a wire insertion groove, the wire insertion groove being a path through which a wire extending from the speaker is exposed to the outside of the body.

3. The authentication information transmission device according to claim 2, wherein the speaker outputs authentication information converted into a sound wave signal and is coupled to the inside of the body while forming a predetermined angle with the board.

4. The authentication information transmission device according to claim 3, wherein the speaker has a predetermined space formed in a portion in which the speaker faces the opening and is coupled at a predetermined angle to come into contact with the body on the side opposite to the opening.

5. The authentication information transmission device according to claim 2, wherein areas of the sound wave output unit coupling holes formed in the board are larger than areas of horizontal cross sections of the protrusions.

6. The authentication information transmission device according to claim 5, wherein, when the protrusions are inserted into the sound wave output unit coupling holes, predetermined empty spaces are formed in the sound wave output unit coupling holes.

7. The authentication information transmission device according to claim 5, wherein the board further includes a switching unit included adjacent to a position at which the sound wave output unit is coupled, the switching unit including a button protruding in a direction of the position at which the sound wave output unit is coupled.

8. The authentication information transmission device according to claim 7, wherein, when the sound wave output unit is pressed by an external force, the sound wave output unit is pushed backward by a difference between the areas of the sound wave output unit coupling holes and the areas of the horizontal cross sections of the projections, and the button of the switching unit is pressed when the sound wave output unit is pushed backward.

9. The authentication information transmission device according to claim 1, wherein the board includes wire connection unit coupling holes formed at positions spaced apart from the sound wave output unit coupling holes by a predetermined distance, and wire connection units are coupled to the wire connection unit coupling holes.

10. The authentication information transmission device according to claim 9, wherein a wire fastening unit connected to a distal end of a wire extending from a speaker accommodated inside the sound wave output unit is inserted into and fastened to the wire connection unit to electrically connect the wire to the wire connection unit, and a length of the wire is longer than a straight line distance from a center of the sound wave output unit to the wire connection unit.

11. The authentication information transmission device according to claim 10, wherein the wire fastening unit is detachably inserted into and fastened to the wire connection unit, and is detached from the wire connection unit when an external force is applied.

\* \* \* \* \*